United States Patent
Cui

(10) Patent No.: US 10,708,399 B2
(45) Date of Patent: Jul. 7, 2020

(54) INTELLIGENT DEVICE AND INTELLIGENT SYSTEM

(71) Applicant: CLOUDMINDS (SHENZHEN) ROBOTICS SYSTEMS CO., LTD., Shenzhen (CN)

(72) Inventor: Boyu Cui, Shenzhen (CN)

(73) Assignee: CLOUDMINDS (SHENZHEN) ROBOTICS SYSTEMS CO., LTD., Shenzhen (CN)

(*) Notice: Subject to any disclaimer, the term of this patent is extended or adjusted under 35 U.S.C. 154(b) by 0 days.

(21) Appl. No.: 16/464,671

(22) PCT Filed: Nov. 28, 2016

(86) PCT No.: PCT/CN2016/107520
§ 371 (c)(1),
(2) Date: May 28, 2019

(87) PCT Pub. No.: WO2018/094742
PCT Pub. Date: May 31, 2018

(65) Prior Publication Data
US 2019/0349458 A1    Nov. 14, 2019

(51) Int. Cl.
*H04M 1/02* (2006.01)
*G06F 1/16* (2006.01)

(52) U.S. Cl.
CPC ........ *H04M 1/0274* (2013.01); *G06F 1/1632* (2013.01)

(58) Field of Classification Search
CPC .......... G06F 1/1632; G06F 2213/0042; G06F 13/38; G06F 1/266; G06F 13/126;
(Continued)

(56) References Cited

U.S. PATENT DOCUMENTS

| | | | |
|---|---|---|---|
| 2011/0140961 A1* | 6/2011 | Yeh | H04M 1/04 342/357.42 |
| 2011/0319132 A1 | 12/2011 | Hsu | |
| 2013/0325479 A1* | 12/2013 | Krueger | G10L 21/00 704/275 |

FOREIGN PATENT DOCUMENTS

| | | |
|---|---|---|
| CN | 202977815 U | 6/2013 |
| CN | 202977819 U | 6/2013 |

(Continued)

OTHER PUBLICATIONS

ISA State Intellectual Property Office of the People's Republic of China, International Search Report Issued in Application No. PCT/CN2016/107520, dated Sep. 4, 2017, WIPO, 4 pages.

*Primary Examiner* — Kwasi Karikari
(74) *Attorney, Agent, or Firm* — McCoy Russell LLP

(57) ABSTRACT

The present disclosure relates to an intelligent device and an intelligent system. The intelligent device includes a panel, a first communication interface and a processor unit, wherein the processor unit is configured to: when the first communication interface is connected with a second communication interface of the mobile terminal, send a request message to the mobile terminal through the first communication interface, and receive a response message sent by the mobile terminal, or receive a control instruction sent by the mobile terminal though the first communication interface, and perform a corresponding operation according to the control instruction. Through the above technical solution, the intelligent device is capable of achieving a convenient connection with the mobile terminal, so that the mobile terminal can be used as a module for communication, processing, networking and other functions of the intelligent device so as to achieve the intelligence of the intelligent device.

16 Claims, 6 Drawing Sheets

(58) Field of Classification Search
CPC ...... G06F 21/31; G06F 13/14; G06F 13/1668; G06F 15/16; G06F 1/1607; G06F 1/263; H04W 4/80; H04W 12/003; H04W 12/06; H04W 4/00; H04W 88/02; H04W 12/00522

See application file for complete search history.

(56) References Cited

FOREIGN PATENT DOCUMENTS

| | | |
|---|---|---|
| CN | 104767819 A | 7/2015 |
| CN | 105141714 A | 12/2015 |
| CN | 205015804 U | 2/2016 |
| CN | 205624812 U | 10/2016 |

* cited by examiner

INTELLIGENT DEVICE AND INTELLIGENT SYSTEM

CROSS-REFERENCE TO RELATED APPLICATIONS

The present application is a U.S. National Phase of International Patent Application Serial No. PCT/CN2016/107520 entitled "INTELLIGENT DEVICE AND INTELLIGENT SYSTEM," filed on Nov. 28, 2016. The entire contents of the above-cited application are hereby incorporated by reference in their entirety for all purposes.

FIELD OF THE INVENTION

The present disclosure relates to an intelligent device, and further relates to an intelligent system having the intelligent device.

BACKGROUND OF THE INVENTION

After a mobile terminal (for example, a mobile phone, a tablet computer and the like) is connected with the network, cloud computing and big data analysis and retrieval can be realized. After an intelligent device (for example, an intelligent robot, a vehicle, a medical device, engineering machinery and the like) is connected with the mobile terminal, the mobile terminal can be used as a module for communication, processing, networking and other functions in the intelligent device so as to achieve the intelligence of the intelligent device. However, the existing intelligent device lacks a structure that can be conveniently connected with the mobile terminal.

SUMMARY OF THE INVENTION

The object of the present disclosure is to provide an intelligent device capable of achieving convenient connection with a mobile terminal.

In order to achieve the above object, the present disclosure provides an intelligent device comprising a panel, a first communication interface and a processor unit, a groove for accommodating a mobile terminal is formed in the panel, the first communication interface is disposed on a bottom surface of the groove and is connected with the processor unit, and the processor unit is configured to: when the first communication interface is connected with a second communication interface of the mobile terminal, send a request message to the mobile terminal through the first communication interface, and receive a response message sent by the mobile terminal, or receive a control instruction sent by the mobile terminal through the first communication interface, and perform a corresponding operation according to the control instruction.

Optionally, the first communication interface is a male interface.

Optionally, the intelligent device further comprises a first elastic member, the first elastic member abuts against the first communication interface, so that the first communication interface can float along a direction perpendicular to the bottom surface of the groove.

Optionally, a first through hole matching the cross section of the first communication interface is formed in the bottom surface of the groove, and the first communication interface is disposed in the first through hole in a penetration manner.

Optionally, the intelligent device further comprises a holding structure disposed on a side face of the groove for holding the mobile terminal.

Optionally, the holding structure comprises a clamping member for being clamped on a ditch groove formed in the side face of the mobile terminal, and a second elastic member which abuts against the clamping member, so that the clamping member can float along a direction perpendicular to the side face of the groove.

Optionally, a second through hole matching the cross section of the clamping member is formed in the side face of the groove, and the clamping member is disposed in the second through hole in a penetration manner.

Optionally, the groove includes a rectangular accommodating space matching the mobile terminal and a finger operation space protruding outward from two opposite sides of the rectangular accommodating area.

Optionally, the intelligent device is one of an intelligent robot, a vehicle, a medical device and an engineering machine.

Through the above technical solution, the intelligent device of the present disclosure is capable of achieving the convenient connection with the mobile terminal, a plug-and-play function between the mobile terminal and the intelligent device is achieved. And by connecting the mobile terminal to the intelligent device, the mobile terminal can be used as a module for communication, processing, networking and other functions in the intelligent device so as to achieve the intelligence of the intelligent device.

The present disclosure further provides an intelligent system including a mobile terminal and the intelligent device as described above, and the second communication interface is disposed at the back of the mobile terminal.

Other features and advantages of the present disclosure will be described in detail in the detailed description which follows.

BRIEF DESCRIPTION OF THE DRAWINGS

The drawings are used for providing a further understanding of the present disclosure and constitute a part of the specification. The drawings, together with the following specific embodiments, are used for explaining the present disclosure, but are not intended to limit the present disclosure. In the drawings.

DETAILED DESCRIPTION OF THE EMBODIMENTS

In order that the technical solutions and advantages of the present disclosure are clearer, exemplary embodiments of the present disclosure will be described in detail below in combination with the drawings. It should be understood that the embodiments described herein are merely used for illustrating and explaining the present disclosure, rather than limiting the present disclosure.

Figure 3:
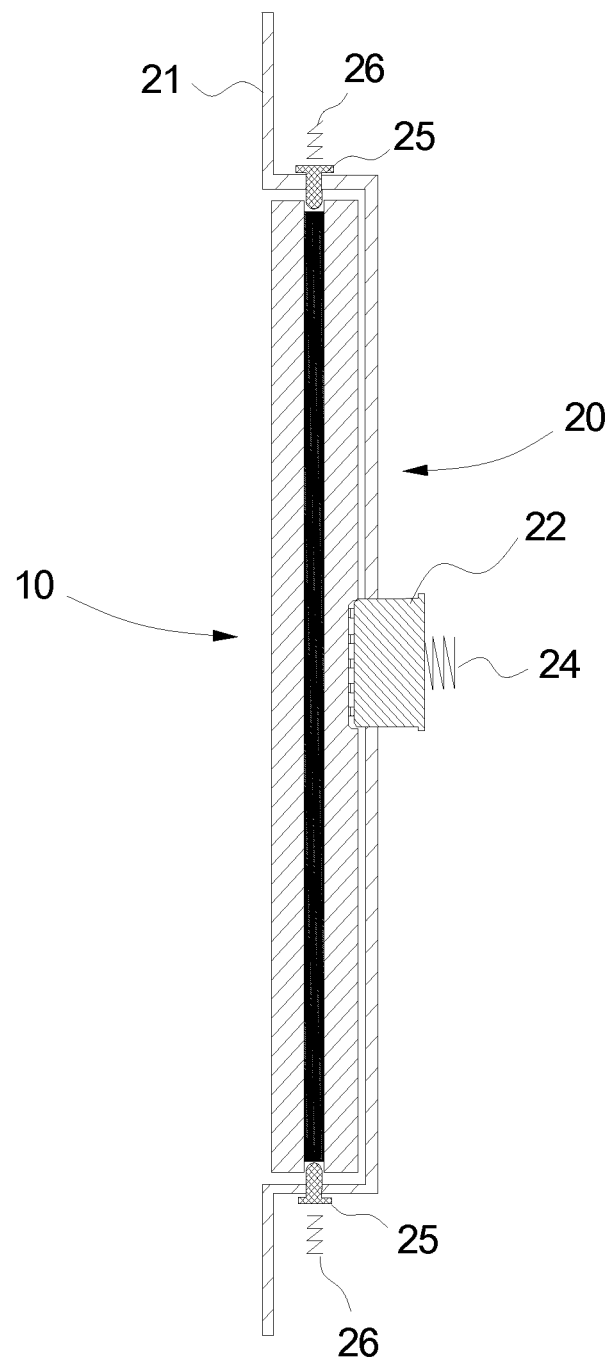
FIG. 3 is a section view along A-A in FIG. 2.
Figure 4:
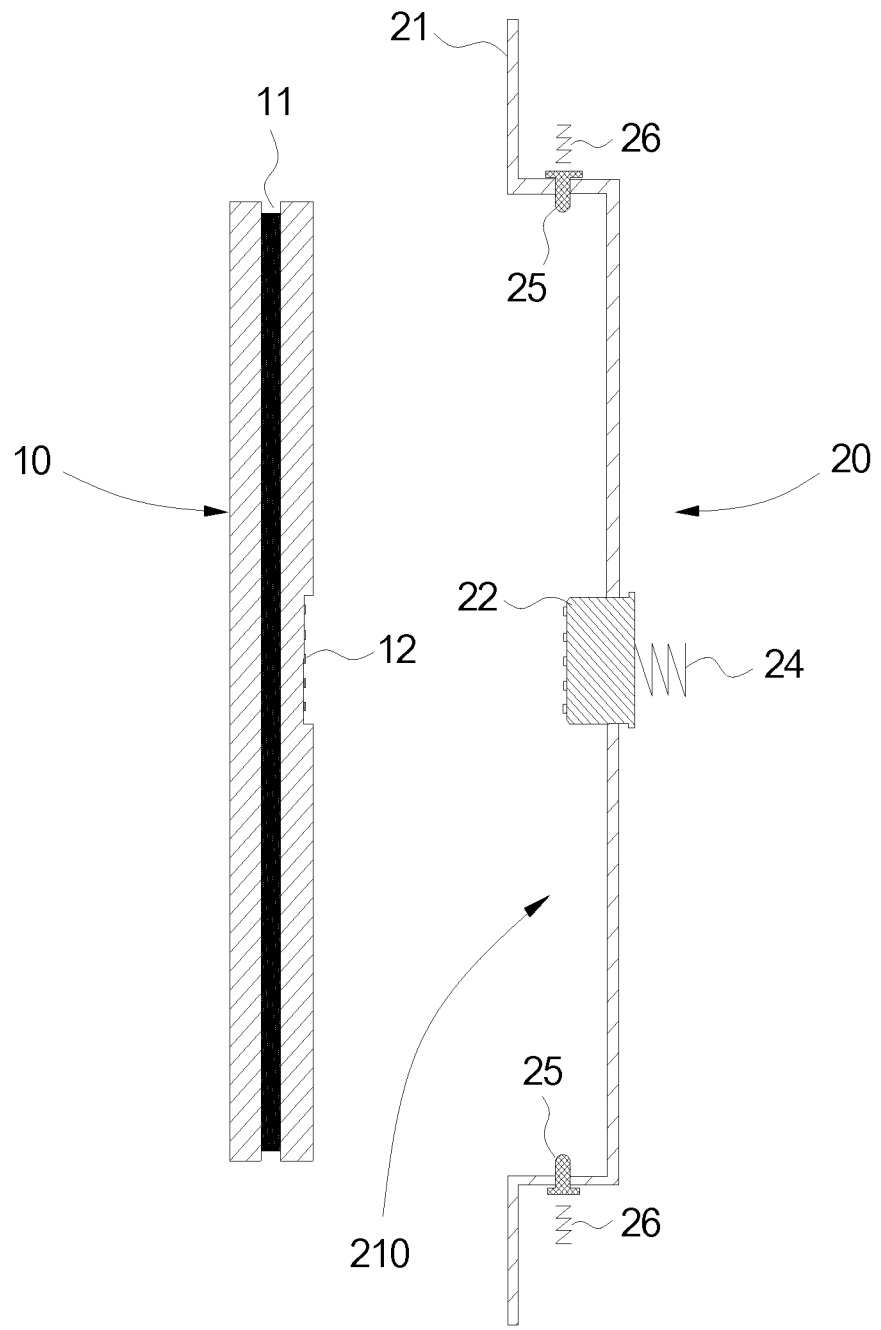
FIG. 4 is a partial section view of an intelligent system provided by an embodiment of the present disclosure, wherein a mobile terminal and an intelligent device are in a non-assembly state.
Figure 6:
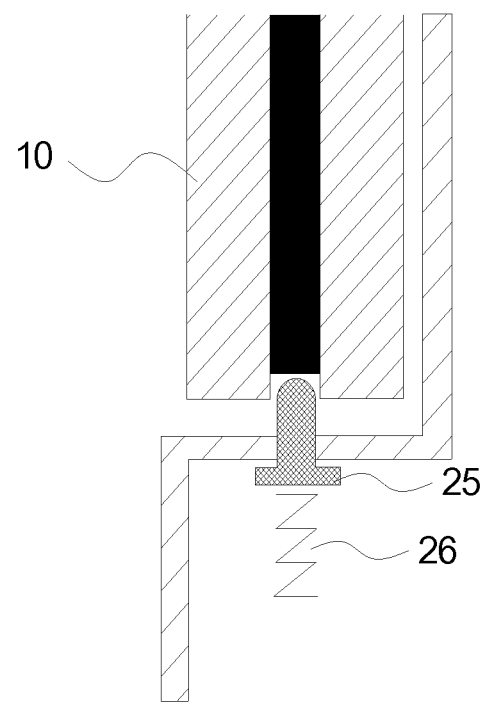
Figure 7:
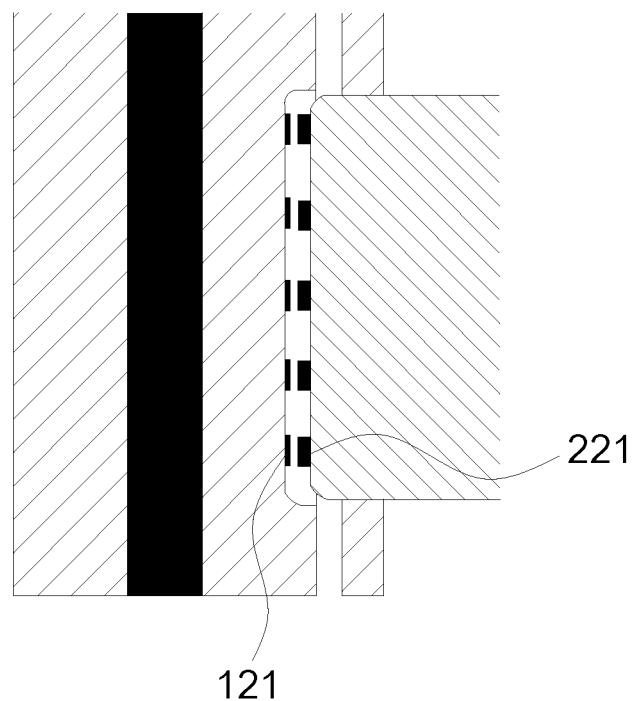
FIG. 7 is a schematic diagram of a contact type contact point connection of a first communication interface and a second communication interface.
Figure 8:
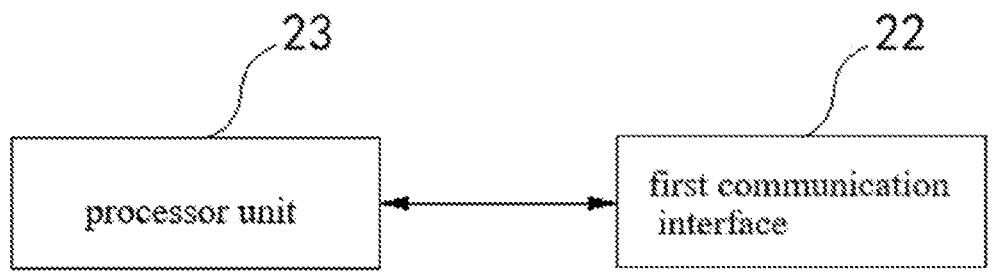
FIG. 8 is a connection schematic diagram of a processor unit and a first communication interface of an intelligent device.

As shown in FIG. 1 to FIG. 8, in an exemplary embodiment of the present disclosure, an intelligent device 20 is provided, including a panel 21, a first communication interface 22 and a processor unit 23 (as can be seen in FIG. 8), a groove 210 (as can be seen in FIG. 4) suitable for accommodating a mobile terminal 10 is formed in the panel 21, the first communication interface 22 is disposed on a bottom surface of the groove 210 and is connected with the processor unit 23, and a second communication interface 12 is formed in the back of the mobile terminal 10.

The processor unit 23 is configured to establish a communication connection (for example, a USB connection, a Uart connection, an I2C and the like) with the intelligent device 20 through the first communication interface 22 when detecting that the first communication interface 22 is connected with the second communication interface 12, after the communication connection is established, send a request message the mobile terminal 10 through the first communication interface 22, and receive a response message sent by the mobile terminal 10, or, after the communication connection is established, receive a control instruction sent by the mobile terminal 10 through the first communication interface 22 and perform a corresponding operation according to the control instruction.

Through the above technical solution, the intelligent device 20 of the present disclosure is capable of achieving a convenient connection with the mobile terminal 10, a plug-and-play function between the mobile terminal 10 and the intelligent device 20 is achieved. And by connecting the mobile terminal 10 to the intelligent device 20, the mobile terminal 10 can be used as a module for communication, processing, networking and other functions of the intelligent device 20 so as to achieve the intelligence of the intelligent device 20.

In the present embodiment, the first communication interface 22 is a male interface, and the second communication interface 12 is a female interface. In other possible embodiments, the first communication interface 22 can be a female interface, and the second communication interface 12 can be a male interface. Of course, the first communication interface 22 and the second communication interface 12 can also be interfaces that do not distinguish male and female polarities.

Specifically, as shown in FIG. 7, the first communication interface 22 can have at least one first contact point 221, and the second communication interface 12 can have at least one second contact point 121, and the first contact point 221 and the second contact point 121 are in contact with each other and are conducted. By adoption of the contact type contact point connection, the insertion and extraction of the mobile terminal 10 can be facilitated.

The first communication interface 22 can be fixedly disposed on the bottom surface of the groove 210. However, in order to be able to adapt to mobile terminals 10 with different thicknesses, the first communication interface 22 and the second communication interface 12 are ensured to be in close contact at all times, as shown in FIG. 3 and FIG. 4, the first communication interface 22 can be configured to be installed on the bottom surface of the groove 210 in a floating manner, the intelligent device 20 can include a first elastic member 24, and the first elastic member 24 is used for applying an elastic bias pressure to the first communication interface 22 when the mobile terminal 10 is inserted into the groove 210, so that the first communication interface 22 abuts on the second communication interface 12.

The first elastic member 24 can be clamped between the bottom surface of the groove 210 and the first communication interface 22. In the embodiment shown in FIG. 3 and FIG. 4, a first through hole is formed in the bottom surface of the groove 210, and the first communication interface 22 is slidably disposed in the first through hole in a penetration manner. The first through hole can limit shaking of the first communication interface 22, so that the first communication interface 22 is aligned with the second communication interface 12.

In order to further ensure that the first communication interface 22 and the second communication interface 12 are tightly coupled, in the present embodiment, the first communication interface 22 and the second communication interface 12 can be magnetic interfaces.

In order to ensure the installation stability of the mobile terminal 10, a holding structure for holding the mobile terminal 10 in the groove 210 can be disposed on the side face of the groove 210.

The holding structure can be in any suitable form. For example, the holding structure can be a rubber strip disposed along the side face of the groove 210. When the mobile terminal 10 is inserted into the groove 210, the rubber strip is pressed and deformed, and the generated elastic force causes the mobile terminal 10 to be clamped.

In the present embodiment, as shown in FIG. 3 to FIG. 6, the holding structure includes a clamping member 25 and a second elastic member 26. A ditch groove 11 is disposed on a side face of the mobile terminal 10 and is formed as a closed loop groove disposed around the mobile terminal 10. When the mobile terminal 10 is inserted into the groove 210, the clamping member 25 is clamped into the ditch groove 11.

The second elastic member 26 can be clamped between the side face of the groove 210 and the clamping member 25. In the embodiment shown in FIG. 3 to FIG. 6, a second through hole is formed in the side face of the groove 210, the clamping member 25 is slidably disposed in the second through hole in the penetration manner, and the second through hole can limit shaking of the clamping member 25.

Figure 5:
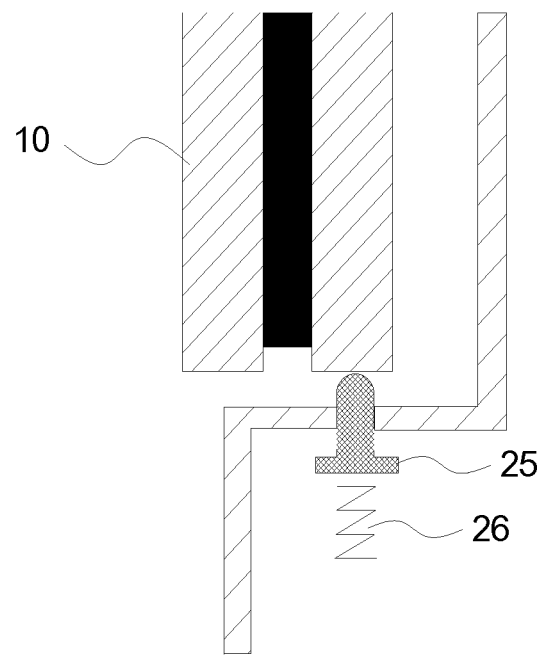
FIG. 5 and FIG. 6 show partial section views of an assembly process of a mobile terminal and an intelligent device.

As shown in FIG. 5 and FIG. 6, a clamping end of the clamping member 25 can be provided with a cambered surface, so that the clamping end can conveniently enter and deviate from the ditch groove 11. Specifically, in the process of inserting the mobile terminal 10 into the groove 210, as shown in FIG. 5, the clamping member 25 is pressed inward by the side face of the mobile terminal 10, and the second elastic member 26 is compressed; when the clamping member 25 is aligned with the ditch groove 11 on the side face of the mobile terminal 10, as shown in FIG. 6, the clamping member 25 extends outward under the action of the second elastic member 26 to be inserted into the ditch groove 11. In the process of pulling out the mobile terminal 10 from the groove 210, the clamping member 25 is pressed by the mobile terminal 10 to retract inward, and the second elastic member 26 is compressed; and when the mobile terminal 10 is disengaged from the groove 210, the clamping member 25 returns to the original position under the action of the second elastic member 26.

Figure 1:
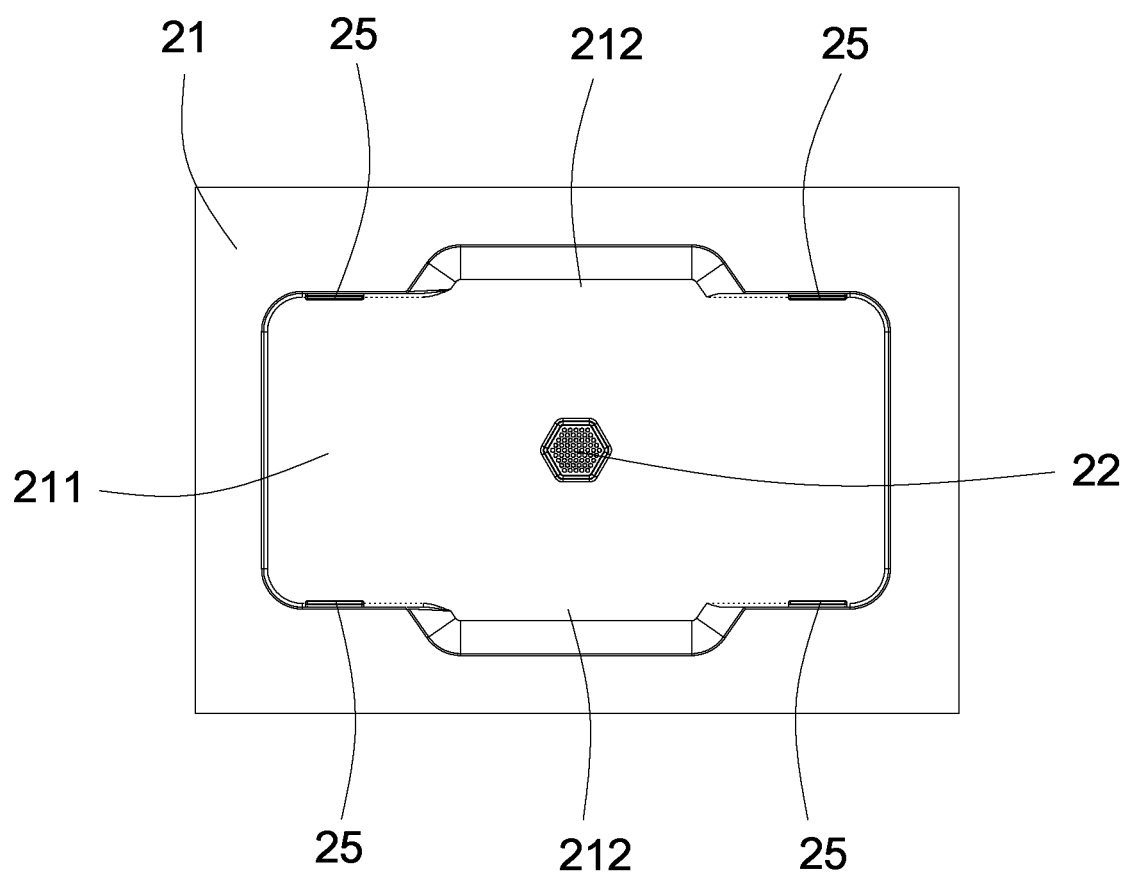
FIG. 1 is a partial front view of an intelligent device provided by an embodiment of the present disclosure.
Figure 2:
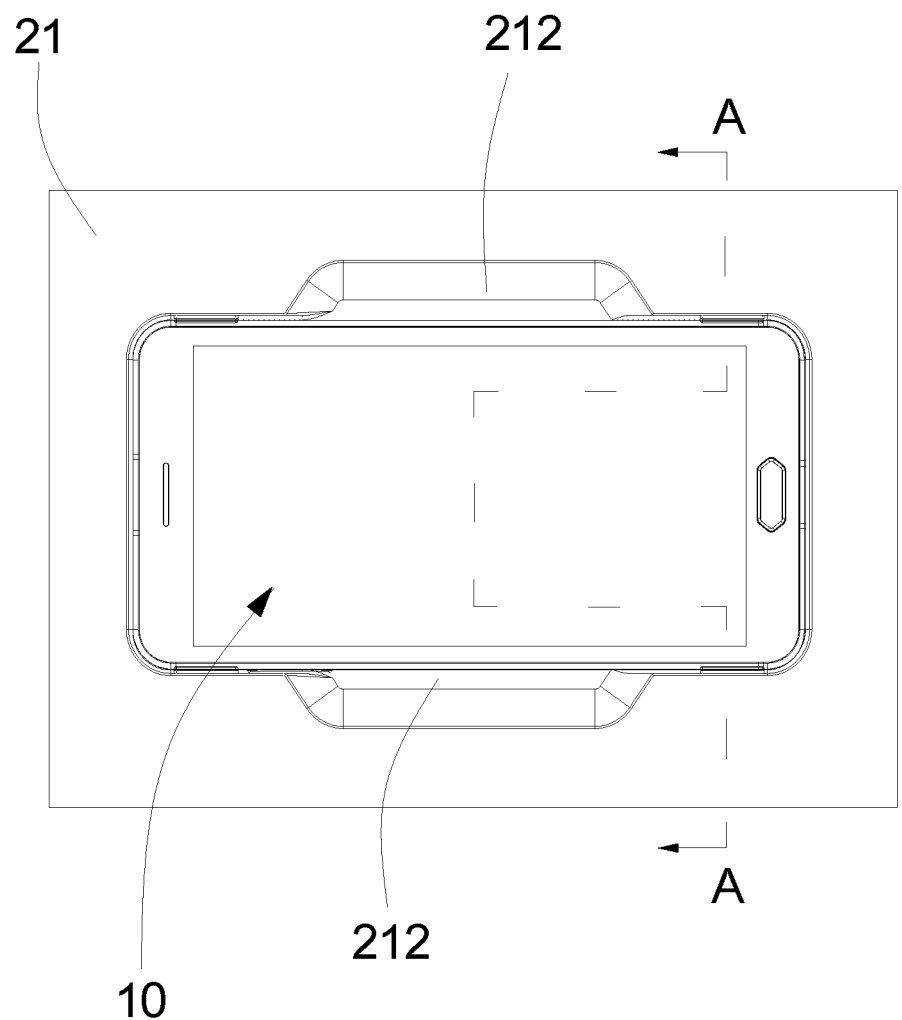
FIG. 2 is a partial front view of an intelligent system provided by an embodiment of the present disclosure, wherein a mobile terminal and an intelligent device are in an assembly state.

The groove 210 can be formed as a rectangular groove that completely matches the mobile terminal 10. However, in order to conveniently pull out the mobile terminal 10 from the groove 210, in the present embodiment, as shown in FIG. 1, the groove 210 includes a rectangular accommodating space 211 matching the mobile terminal 10 and a finger operation space 212 protruding outward from two opposite sides of the rectangular accommodating space 211. The rectangular accommodating space 211 is used for placing the mobile terminal 10, and the finger operation space 212 allows fingers of an operator to enter to clamp the mobile terminal 10 from two opposite side faces of the mobile terminal 10. The rectangular accommodating space 211 includes two longer side edges and two shorter side edges. In order to facilitate clamping by hands, in the present embodiment, as shown in FIG. 1, the finger operation space 212 is formed at the two longer side edges of the rectangular accommodating space 211.

A plurality of clamping members 25 can be provided, and the plurality of clamping members 25 can be distributed on the side face of the groove 210 at intervals. In the present embodiment, as shown in FIG. 1, four clamping members 25 are provided, and the four clamping members 25 are distributed on the two longer side edges of the groove 210 in pairs.

In the present disclosure, the mobile terminal 10 can be, for example, a mobile phone, a tablet computer or the like. The intelligent device 20 can be, for example, an intelligent robot, a vehicle, a medical device, an engineering machine or the like.

In an exemplary embodiment of the present disclosure, an intelligent system is further provided, including the mobile terminal 10 and the intelligent device 20 as described above.

The exemplary embodiments of the present disclosure have been described in detail above in combination with the drawings. However, the present disclosure is not limited to the specific details in the above embodiments, various simple modifications can be made to the technical solutions of the present disclosure within the scope of the technical concept of the present disclosure, and these simple modifications are all within the protection scope of the present disclosure.

It should be further noted that the specific technical features described in the above embodiments can be combined in any suitable manner without contradiction. In order to avoid unnecessary repetition, various possible combinations are not additionally illustrated in the present disclosure.

In addition, arbitrary combinations can be made to various embodiments of the present disclosure, and the arbitrary combinations should be regarded as the contents disclosed by the present disclosure without deviating from the idea of the present disclosure.

The invention claimed is:

1. An intelligent device, comprising a panel, a first communication interface and a processor unit, wherein a groove for accommodating a mobile terminal is formed in the panel, the first communication interface is disposed on a bottom surface of the groove and is connected with the processor unit, and the processor unit is configured to: when the first communication interface is connected with a second communication interface of the mobile terminal, send a request message to the mobile terminal through the first communication interface, and receive a response message sent by the mobile terminal, or receive a control instruction sent by the mobile terminal through the first communication interface, and perform a corresponding operation according to the control instructions;
wherein the intelligent device further comprises a first elastic member, the first elastic member abuts against the first communication interface, so that the first communication interface can float along a direction perpendicular to the bottom surface of the groove.

2. The intelligent device according to claim 1, wherein the first communication interface is a male interface.

3. The intelligent device according to claim 1, wherein a first through hole matching a cross section of the first communication interface is formed in the bottom surface of the groove, and the first communication interface is disposed in the first through hole in a penetration manner.

4. The intelligent device according to claim 1, wherein the intelligent device further comprises a holding structure disposed on a side face of the groove for holding the mobile terminal.

5. The intelligent device according to claim 4, wherein the holding structure comprises a clamping member for being clamped on a ditch groove formed in the side face of the mobile terminal, and a second elastic member which abuts against the clamping member so that the clamping member can float along a direction perpendicular to the side face of the groove.

6. The intelligent device according to claim 5, wherein a second through hole matching a cross section of the clamping member is formed in the side face of the groove, and the clamping member is disposed in the second through hole in a penetration manner.

7. The intelligent device according to claim 1, wherein the groove comprises a rectangular accommodating space matching the mobile terminal and a finger operation space protruding outward from two opposite sides of the rectangular accommodating space.

8. The intelligent device according to claim 1, wherein the intelligent device is one of an intelligent robot, a vehicle, a medical device, and an engineering machine.

9. An intelligent system, comprising a mobile terminal and an intelligent device, wherein a second communication interface is disposed at a back of the mobile terminal,
the intelligent device comprises a panel, a first communication interface, and a processor unit, wherein a groove for accommodating the mobile terminal is formed in the panel, the first communication interface is disposed on a bottom surface of the groove and is connected with the processor unit, and
the processor unit is configured to: when the first communication interface is connected with the second communication interface, send a request message to the mobile terminal through the first communication interface, and receive a response message sent by the mobile terminal, or receive a control instruction sent by the mobile terminal through the first communication interface, and perform a corresponding operation according to the control instructions;
wherein the intelligent device further comprises a first elastic member, the first elastic member abuts against the first communication interface, so that the first communication interface can float along a direction perpendicular to the bottom surface of the groove.

10. The intelligent system according to claim 9, wherein the first communication interface is a male interface.

11. The intelligent system according to claim 9, wherein a first through hole matching a cross section of the first communication interface is formed in the bottom surface of the groove, and the first communication interface is disposed in the first through hole in a penetration manner.

12. The intelligent system according to claim 9, wherein the intelligent device further comprises a holding structure disposed on a side face of the groove for holding the mobile terminal.

13. The intelligent system according to claim 12, wherein the holding structure comprises a clamping member for being clamped on a ditch groove formed in the side face of the mobile terminal, and a second elastic member which abuts against the clamping member so that the clamping member can float along a direction perpendicular to the side face of the groove.

14. The intelligent system according to claim 13, wherein a second through hole matching a cross section of the clamping member is formed in the side face of the groove, and the clamping member is disposed in the second through hole in a penetration manner.

15. The intelligent system according to claim 9, wherein the groove comprises a rectangular accommodating space matching the mobile terminal and a finger operation space protruding outward from two opposite sides of the rectangular accommodating space.

16. The intelligent system according to claim 9, wherein the intelligent device is one of an intelligent robot, a vehicle, a medical device and an engineering machine.

* * * * *